United States Patent [19]

Lipman

[11] Patent Number: 4,953,071
[45] Date of Patent: Aug. 28, 1990

[54] AUXILIARY EXCITATION CIRCUIT FOR PHASED TRANSFORMERS

[75] Inventor: Kenneth Lipman, West Hartford, Conn.

[73] Assignee: International Fuel Cells, Inc., South Windsor, Conn.

[21] Appl. No.: 431,615

[22] Filed: Nov. 3, 1989

[51] Int. Cl.$^5$ .............................................. H02M 7/77
[52] U.S. Cl. ....................................... 363/72; 307/46; 307/82; 363/43
[58] Field of Search ................ 363/43, 71, 72; 307/46, 307/6, 57, 58, 82, 105, 107, 3, 75

[56] References Cited

U.S. PATENT DOCUMENTS

| | | | |
|---|---|---|---|
| 3,211,914 | 10/1965 | Anderson | 307/3 |
| 3,641,417 | 2/1972 | Gyugyi. | |
| 3,781,635 | 1/1972 | Saver. | |
| 3,792,286 | 2/1974 | Meier. | |
| 3,839,667 | 10/1974 | King. | |
| 3,970,914 | 7/1976 | Salzman et al.. | |
| 4,204,264 | 5/1980 | Lipman | 363/71 |
| 4,460,950 | 7/1984 | Finney | 363/44 |
| 4,532,581 | 7/1985 | Miyairi | 363/39 |
| 4,719,550 | 1/1988 | Powell et al. | 307/46 |
| 4,890,213 | 12/1989 | Seki | 307/82 |

Primary Examiner—William H. Beha, Jr.
Attorney, Agent, or Firm—McCormick, Paulding & Huber

[57] ABSTRACT

A novel electrical inverter includes a source of direct current (DC) signals, a plurality, N, of addressable electrical switching devices where N does not equal two configured in parallel to receive signals from the DC source. The electrical switching devices generate a plurality of output signals phased relative to one another. An output transformer has a plurality of parallel configured input inverter winding sets for receiving and transforming a respective one of the phased electrical switching device output signals, and a plurality of serially configured output winding sets providing three phased fundamental signals as the sum of the transformed signals. The inverter is characterized by an auxiliary excitation circuit having a plurality of low voltage AC signal sources each configured with auxiliary winding sets and a series reactor and each for providing excitation signals to a plurality auxiliary winding sets each configured in parallel with and identical to a respective one of said output transformer input winding sets.

12 Claims, 5 Drawing Sheets 4,953,071

AUXILIARY EXCITATION CIRCUIT FOR PHASED TRANSFORMERS

TECHNICAL FIELD

This invention relates to electrical systems for cancelling signal harmonics in electrical circuits and more particularly to sytems for use in three-phase power inverters which cancel signal harmonics by means of an auxiliary excitation circuit.

BACKGROUND OF THE INVENTION

Electrical systems for converting electrical energy selectively either from DC to AC or from AC to DC are known in the art. Systems which function as inverters, that is, converting electricity from DC to AC, or rectifiers (converting electrical energy from AC to DC) can be found that provide output power in excess of a few hundred kilowatts. These high power systems require multiple converter bridges. When the system is configured as an inverter, each bridge provides, at each three phase output (or "poles"), a square wave signal for each of the output phases of the converter. Typically, each output pole signal is filtered and summed with corresponding phase angle signals from other bridges in an output transformer to provide an output fundamental signal for each output phase of the converter.

The bridge signals are essentially square waves and are therefore characterized by a harmonic signal content which causes the power level of the bridge signals to change each time a pole is switched. The harmonic frequencies of the signal may be determined in a known manner through Fourier series expansion of a square wave signal. As is known, only the odd harmonics are present in the expansion. For square wave fundamental signals measured between output poles of a three-phase system, the third harmonic and multiples thereof (triplens) are inherently cancelled so that, in addition to the fundamental signal, only the odd harmonic signals less triplens will be present. That is, only the first (fundamental), fifth, seventh, eleventh, thirteenth, seventeenth, nineteenth, twenty third, twenty fifth, etc. will be found. It is these harmonic signals which must be cancelled.

Harmonic cancellation circuitry for multi-bridge three-phase converters are known in the art and include the cancellation circuitry disclosed in U.S. Pat. No. 4,204,264. The '264 harmonic cancellation circuitry provides for cancellation of all harmonics of an order less than (6N−1) from the signal presented each of the output phases of three-phase converter. The phased outputs of the bridges provide the associated fundamental signal at a phase angle determined by a phased gate signal generated by a gate signal source.

In general, harmonic signal cancellation is accomplished by adding the output signals of the phase displaced bridges of an inverter in a manner to bring the signal components all to the same phase angle. For three bridges the +20° bridge is retarded 20°. The −20° bridge is advanced 20°. The 0° bridge is not changed in phase angle.

A typical inverter includes a DC signal source configured with a plurality of bridges along with output transformers and phase cancellation circuitry. There are several possible mechanisms which enable the transformers to be connected so that the harmonic signals in the output of the inverter are cancelled. In a known inverter produced for the PC23 Fuel Cell Power Plant by the Toshiba Corporation of Japan, the transformer secondaries are connected in series to cancel harmonics below the seventeenth. Phase shifting is accomplished by "zigzag" connections on two of the three output transformers in order to shift the phase the desired amount.

The aforementioned circuit configuration results in the fundamental signal components adding in phase with harmonic signal cancellation. No output voltage is developed for the fifth, seventh, eleventh and thirteenth harmonics. The seventeenth and nineteenth are the first harmonics present and the pattern repeats every eighteen harmonic numbers. While this configuration uses a minimum of electrical components and power, there are problems with uniform energization of the transformers when the inverter bridges are not operating.

SUMMARY OF THE INVENTION

An object of the present invention is to provide an auxiliary excitation circuit for providing harmonic signal cancellation in a multi-bridge three-phase inverter using auxiliary winding on an output transformer.

Another object of the present invention is to provide a circuit of the foregoing type wherein auxiliary excitation circuitry can provide electrical power back to an inverter DC signal source without the need for a separate DC signal supply charging mechanism.

Another object of the present invention is to provide a circuit of the foregoing type which both defines and stabilizes the voltages on an output transformer when the inverter is switched off with the output transformer electrically connected to a load.

According to the present invention, an electrical inverter includes a source of direct current (DC) signals, a plurality, N, of addressable electrical switching devices where N does not equal two configured in parallel to receive signals from the DC source. The electrical switching devices generate a plurality of output signals phased relative to one another. An output transformer has a plurality of parallel configured input inverter winding sets for receiving and transforming a respective one of the phased electrical switching device output signals, and a plurality of serially configured output winding sets providing three phased fundamental signals as the sum of the transformed signals. The inverter is characterized by an auxiliary excitation circuit having a plurality of low voltage AC signal sources each configured with auxiliary winding sets and a series reactor. The AC signal source provide excitation signals to a plurality auxiliary winding sets each configured in parallel with and identical in phase to a respective one of said output transformer input winding sets.

DESCRIPTION OF THE PREFERRED EMBODIMENT

Figure 1:
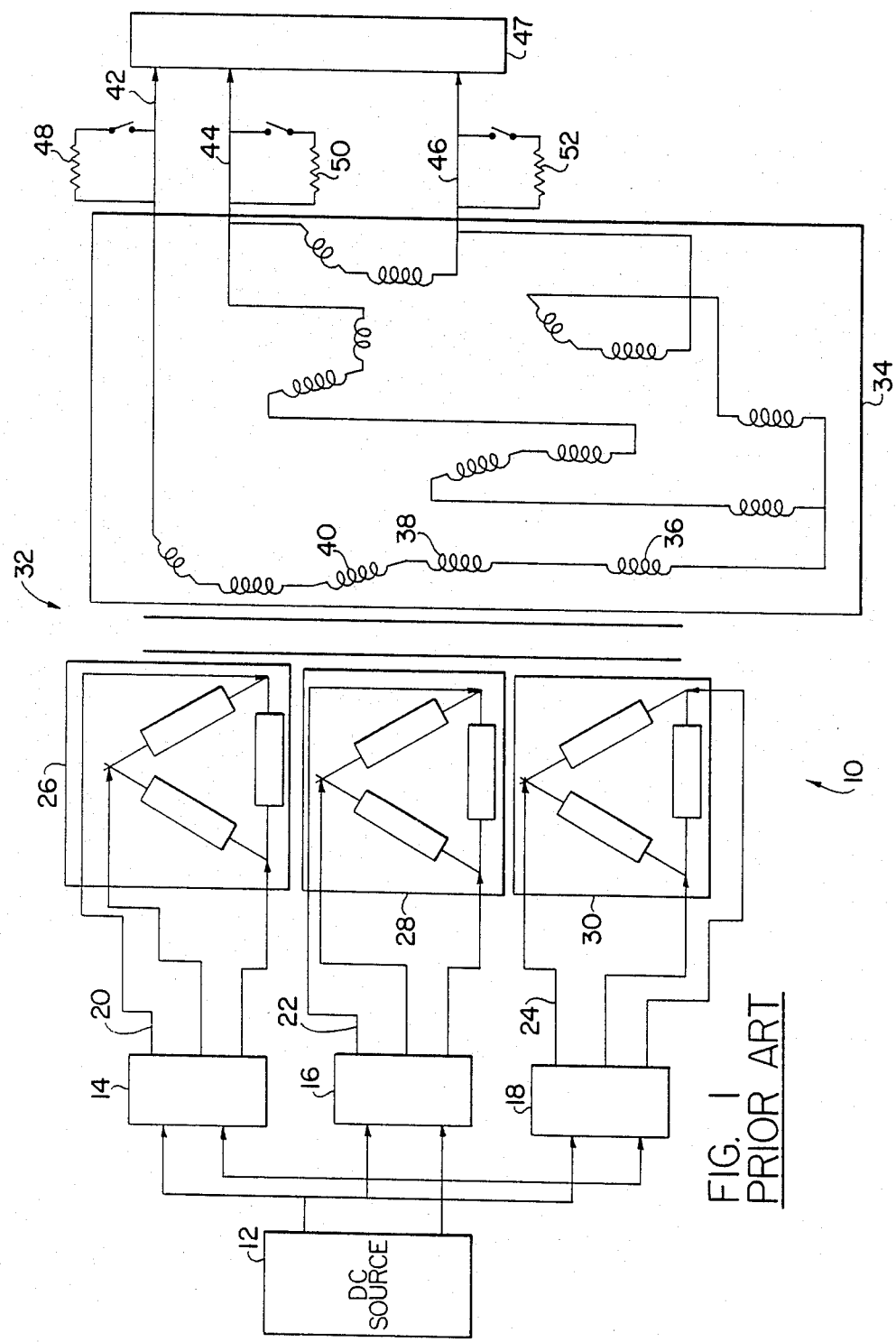
FIG. 1 is a simplified schematic illustration of a known inverter having serially connected output windings.

Referring now to FIG. 1, there is shown in a simplified schematic illustration a portion of a circuit 10. The circuit 10 is an inverter and therefore includes a DC power source 12 such as a fuel cell of the type marked by International Fuel Cells, a subsidiary of United Technologies Corporation. The source 12 is configured in a known manner with bridges 14, 16 and 18. The bridges are of a type well known in the art and include thyristors activated by phased gate signals from an adjustable gate signal source not shown and not part of the present invention. Typically, each thyristor is shunted by an anti-parallel diode to suppress transient voltages associated with switching the bridges. The bridges as well as certain other known elements used in the preferred embodiment are disclosed in the commonly owned U.S. Pat. No. 4,204,264 incorporated herein by reference.

The gate signal source provides gate signals displaced from each other by 120° generating phase displaced signals at the phased outputs or poles 20 through 24 of the bridges. Each of the respective output signals of the bridges are presented to inverter winding sets 26, 28 and 30 of an output transformer 32. The secondary winding sets 34 of the transformer 32 are comprised of windings such as windings 36, 38 and 40 configured in series in a known "zigzag" manner such that the output signals provided on lines 42, 44 and 46 are set at −20°, +20° and 0°, respectively. The circuit 10 is exemplary of a circuit found in the inverter Model PC23 marketed by the Toshiba Corporation. The circuit 10 presents a three phase signal to a load 47 such as a power grid.

The inverter windings 26, 28 and 30 of the transformer 32 are driven by signals received from the inverter bridges through series reactors not shown in FIG. 1. Therefore, the voltages on each transformer winding is defined by the operating inverter bridge voltage. Because of the series connection of the secondary winding sets 34, the same current must flow through all of the secondary windings. The series connection of transformer secondaries results in harmonic cancellation below the seventeenth harmonic. This circuit configuration works well when the inverter is running in a steady state mode and uses a minimum of electrical components and power. However, there are problems with the uniform energization of the transformer bank when the inverter bridges are not operating.

Harmonic cancellation is accomplished in the circuit 10 by the addition of output signals from the phase displaced bridges of an inverter in a known manner to bring the fundamental signal components all to the same phase angle. For the three bridges shown in FIG. 1, the output signal from the +20° bridge is retarded by 20°, the output signal from the −20° bridge is advanced 20° and the 0° bridge signal is not changed. No tuned filters are needed. This circuit configuration results in signal fundamental components added in phase. No output voltage is developed for the fifth, seventh, eleventh and thirteenth harmonics. As noted above, no triplens signals are present as there is inherent cancellation of the third harmonics and multiples thereof in a circuit of this type. The seventeenth and nineteenth harmonics are the first signal harmonics present in the output signal of the circuit 10. This harmonic signal cancellation pattern then repeats for higher harmonic orders.

If, however, the inverter is turned off for any reason and excitation is provided by the high voltage secondary, the distribution of voltages on the circuit elements is a function of the impedance of the individual transformer windings. If the windings were identical and completely linear the signal voltage would divide equally thereacross. In practice, however, neither of the above conditions can be met, and therefore both transient and steady state secondary winding voltages differ in magnitude in a non-linear manner.

As the windings are energized, high currents are transmitted to the inverter winding sets and unequal, distorted waveforms characterize the signals on each winding. After a steady state is reached the voltages across the windings are still out of voltage balance so that some of the inverter bridges are subjected to higher than normal voltages. This results in a current being delivered to the inverter bridges which must be absorbed by a DC load or the voltage across that inverter will become greater than its maximum operating voltage.

To accommodate this rise in current prior art circuits having serially connected secondary winding sets have been characterized by resistive elements inserted in series with the utility line and schematically shown in FIG. 1 as resistors 48, 50 and 52 which can be switched into the circuit when the inverter is started. This shunt load on the DC bus is removed when the inverter is running. The extra equipment needed to acomplish the switching generates extra costs and is undesireable.

The source of the voltage imbalance during inverter start up can be traced to the 20° phase displacement between the windings used to produce harmonic signal cancellation. As a common current flows through the output windings such as windings 36, 38 and 40, high magnetic flux densities are reached in the windings at different points in a signal cycle of 360°. Those skilled in the art will note that this problem is not present with a two bridge device since, at 30°, a "delta-WYE" displacement causes a harmonic signal distribution on the windings which is equal in magnitude. However, the problem associated with the start-up detailed above exists for all higher number of bridge combinations with series connected output windings.

Figure 2:
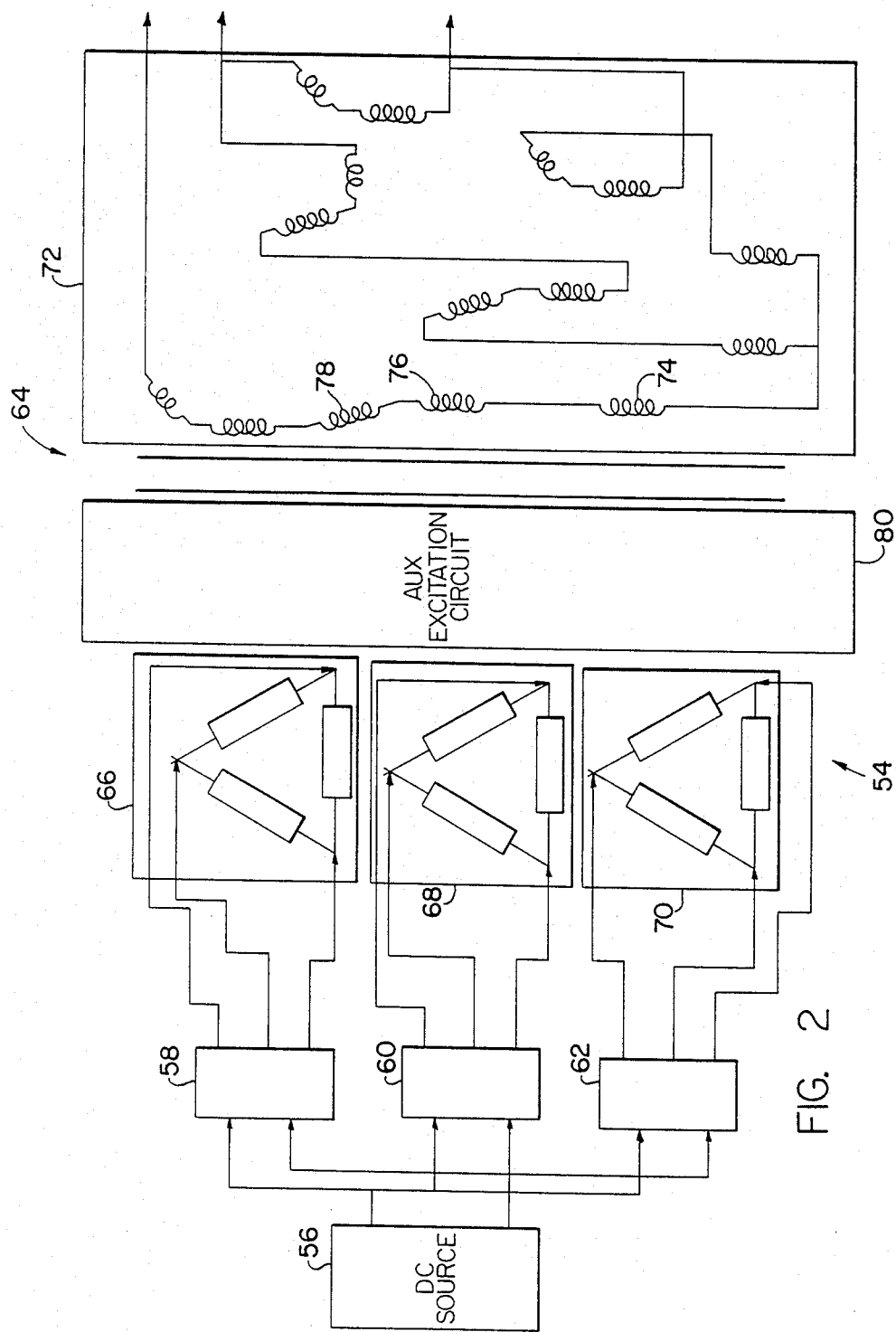
FIG. 2 is a simplified schematic illustration of an inverter having an auxiliary excitation circuit provided according to the present invention.

Referring now to FIG. 2, there is shown in schematic illustration an inverter 54 provided according to the present invention. The inverter 54 includes a DC source 56, typically a fuel cell, presenting direct current signals to bridges 58, 60 and 62 which are similar to those described hereinabove. The bridges are configured with an output transformer 64 that has inverter winding sets 66, 68 and 70 which are also of a construction and a configuration similar to the inverter winding sets described hereinabove with respect to the circuit 10. The secondary 72 of the transformer 64 is configured with a plurality of a series connected windings, such as windings 74, 76 and 78 that are shown in a zigzag configuration and are otherwise identical to those described hereinabove. The inverter 54 is characterized by an auxiliary excitation circuit 80 which is detailed hereinafter.

Figure 3:
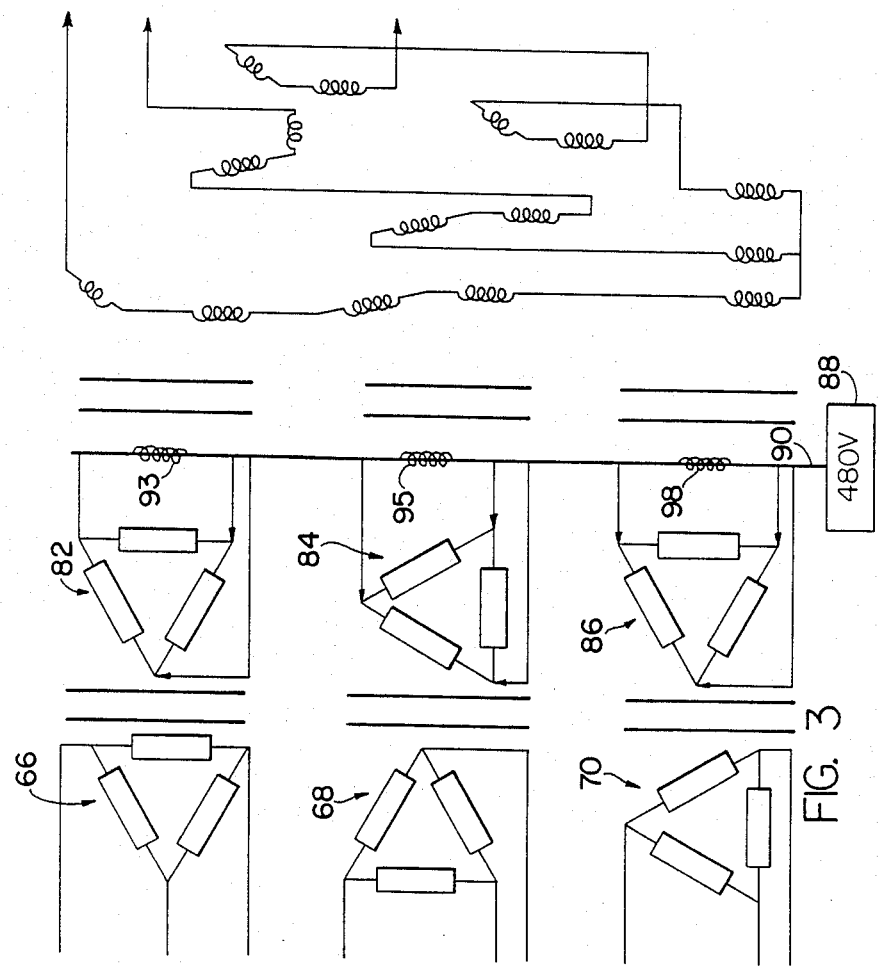
FIG. 3 is a schematic illustration of a portion of an auxiliary excitation circuit found in the inverter of FIG. 2.

FIG. 3 is a simplified schematic illustration of the auxiliary excitation circuit 80 provided according to the present invention. The auxiliary excitation circuit is comprised of a sequence of auxiliary winding sets 82, 84 and 86 configured in parallel with and identical to the inverter winding sets 66–70. The auxilliary winding sets receive low voltage AC power (400–480V) from a source 88 which provides three phase signals on lines 90. Series reactors 93, 95 and 98 are used to limit current flow through the winding sets and signal harmonic generation. The circuit 80 requires input power on the order of 10 to 15 percent of the output power rating of the device and can be operated with less expensive, conventional low voltage switch gear. Those skilled in the art will note that an inverter with the present auxiliary excitation circuit can be powered up without a high voltage line being present.

Figure 4:
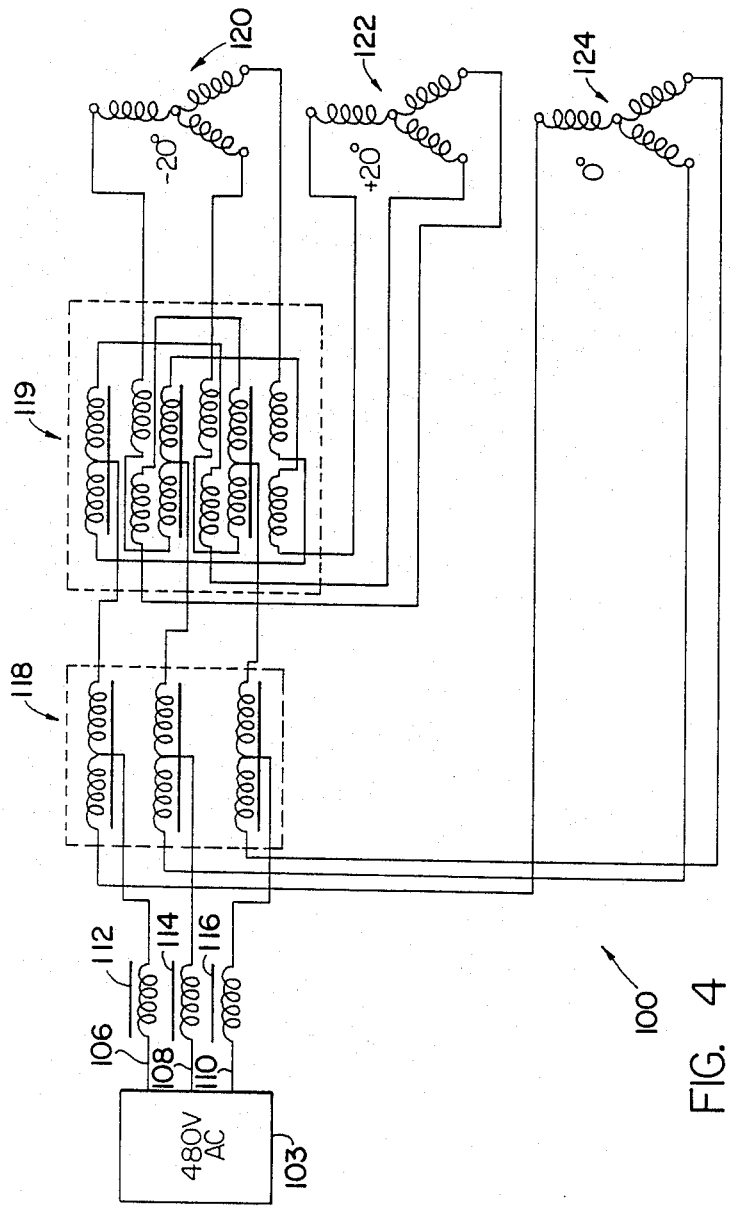
FIG. 4 is a simplified schematic illustration of an alternative preferred auxiliary excitation circuit provided according to the present invention.

FIG. 4 is a simplified illustration of a preferred auxiliary excitation circuit 100 provided according to the present invention. A low voltage signal source 103 (400–480 volts) provides on lines 106, 108 and 110 three phase AC signals to series reactors 112, 114 and 116. The output signals of the reactors are provided to first and second cancellation auto transformer sets 118, 119 configured as shown so as to provide the harmonic signal cancellation and the necessary signal phase separation. These signals are received by auxiliary winding sets 120, 122 and 124 configured with a respective one of the inverter winding sets as shown in FIG. 3.

The auxiliary winding sets are configured parallel to and in the same manner as the inverter winding sets. The auxiliary winding sets need not be disconnected when the inverter is turned off or when the inverter is operating if the presentation of a small amount of power to the low voltage auxiliary power bus (AC source 103) is acceptable.

The operation of the circuit 100 in an inverter of the present type can be understood as follows. Initially, the inverter is assumed to be in a quiescent state (defined as the absence of signal transients) and there is no connection to the grid or load, nor is there any DC bus voltage (i.e. the fuel cell is electrically open). When the auxiliary excitation circuit is connected to a low voltage source, current flow therethrough is limited by the series impedance of the auxiliary windings, since the inverter bridges are electrically shorted when the DC bus voltage is zero. In this situation, the output voltage is simply the voltage drop of the anti-parallel diodes in the bridges. When AC current flows into the bridges it is rectified and the DC bus is charged. Due to the high impedance of the auxiliary series reactors, the charge rate is low and over-voltage of the DC bus is minimized. Those skilled in the art will not that no separate DC charging supply is needed to charge the AC source 103.

Proper selection of the elemental values of the windings of the auxiliary winding sets ensures that the excitation for the transformers comes from the auxiliary source and that current flow therethrough is characterized by low signal harmonic current values. This double excitation with both regular and auxiliary windings connected minimizes the high peaks of current that could cause high DC bus voltages. Consequently, the auxiliary excitation circuit provides a means for charging the DC bus or battery without a separate DC charging power supply. The auxiliary circuit helps stabilize the winding voltages with the inverter off and with the output windings connected to the grid. The auxiliary circuit eliminates the need to provide a switched charging element between the power grid and the output transformers.

The circuit 100 of FIG. 4 uses current addition harmonic cancellation magnetics. While this circuit requires that additional magnetic circuit elements be incorporated into an inverter, it provides a means for harmonic signal currents to flow between windings and allows the different voltages on the output transformer windings to be determined. Since the voltages are defined for the three winding sets, particularly for the fundamental signal and selected harmonics thereof, the voltage overing or voltage build-up on the DC bus is eliminated while the inverter is not on.

Note that the cancellation magnetics used in the circuit 100 are three phase, and therefore can be smaller sized auto transformers since no "triplens" signals need by accomodated. As a result, the nine wires coming from the winding sets are reduced to three wires through the series reactors. Only three, three-phase transformer cores are required in the preferred embodiment. The circuit of FIG. 4 is characterized by the +20° and −20° bridges combining to produce a 0° phased input signal. The second auto winding set 119 mixes the two 0° signals. The ratio of the tap winding to the isolated windings is 1,532 for the winding displaced +20° and −20°. The mixing windings have a ratio of 1 to 0.532 as measured from the 0° bridge.

Figure 6:
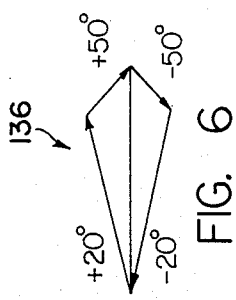
FIG. 6 is a simplified illustration of a phase relationship of selected harmonic sigals in a portion of the circuit of FIG. 5.
Figure 5:
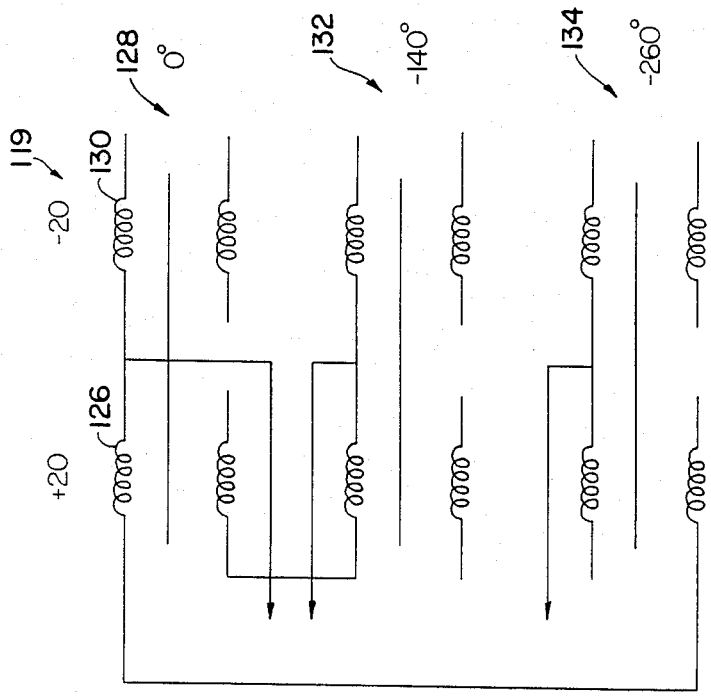
FIG. 5 is a diagrammatic illustration of a portion of the circuit of FIG. 4 showing the relative phases of current flowing therein.

FIG. 5 is a diagrammatic illustration showing the relative phases of current flowing in autotransformer winding set 119. Current flowing through transformer winding 126 of transformer subset 128 is displaced in phase by 20° from 0°, while current flowing through transformer winding 130 is displaced from 0° by −20°. A similar phase relationship for the other transformer subsets 132 and 134 is also found. The sum of current vectors 136 flowing in subset 128 for the fifth harmonic is shown in FIG. 6. As illustrated, the sum of the ampere turns adds to zero and there is no voltage drop across the transformer winding set 119.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. An electrical inverter comprising:
  a DC source of direct current (DC) signals;
  a plurality, N, of addressable electrical switching means where N does not equal two configured in parallel to receive signals from said DC source, said electrical switching means for generating a plurality of output signals phased relative to one another;
  an output transformer having a plurality of parallel configured input winding sets for receiving and transforming a respective one of said phased electrical switching means output signals, and a plurality of serially configured output winding sets providing three phased fundamental signals as the sum of said transformed signals; and
  an auxiliary excitation circuit having a plurality of low voltage AC signal sources each configured with an auxiliary winding set and a series reactor and each for providing excitation signals to a plurality auxiliary winding sets each configured in parallel with and identical in phase to a respective one of said output transformer input winding sets.

2. The inverter of claim 1 wherein said low voltage AC signal source provides 480V three phase signals.

3. The inverter of claim 1 wherein said electrical switching means comprises a plurality of addressable electrical bridges.

4. The inverter of claim 3 wherein said electrical bridges each comprise a thyristor.

5. The inverter of claim 1 wherein said auxiliary excitation circuit comprises a single low voltage AC signal source for providing signals to a plurality of serially configured signal harmonic cancellation auto-transformers.

6. The inverter of claim 1 wherein said output transducer input windings are in a "delta" electrical configuration.

7. An auxiliary electrical circuit for use in an electrical inverter having a source of direct current (DC) signals, a plurality, N, of addressable electrical switching means where N does not equal two configured in parallel to receive signal from said DC source, the electrical switching means for generating a plurality of output signals phased relative to one another, an output transformer having a plurality of parallel configured input winding sets for receiving and transforming a respective one of three phased electrical switching means output signals, and a plurality of serially configured output winding sets providing three phased fundamental signals as the sum of the transformed signals, said auxiliary electrical circuit comprising:

a plurality of low voltage AC signal sources;

a plurality of reactors configured in series with said AC sources for receiving signals therefrom;

a plurality of auxiliary winding sets configured in parallel with and identical in phase to a respective one of said output transformer input winding sets.

8. The circuit of claim 7 wherein said low voltage AC signal source provides 480V three phase signals.

9. The circuit of claim 7 wherein said electrical switching means comprises a plurality of addressable electrical bridges.

10. The circuit of claim 9 wherein said electrical bridges each composite a thyristor.

11. The circuit of claim 7 wherein said auxiliary excitation circuit comprises a single low voltage AC signal source for providing signals to a plurality of serially configured signal harmonic cancellation auto-transformers.

12. The circuit of claim 7 wherein said output transducer input windings are in a "delta" electrical configuration.

* * * * *